(12) United States Patent
Zusman et al.

(10) Patent No.: US 9,075,124 B2
(45) Date of Patent: Jul. 7, 2015

(54) APPARATUS FOR ARROW LOCATING AND GAME TRACKING

(75) Inventors: George V. Zusman, Houston, TX (US); Val J. Pollak, Clarence, NY (US); Kendrick R. Bennet, Tewksbury, MA (US)

(73) Assignee: Archer Quest, Inc., Houston, TX (US)

( * ) Notice: Subject to any disclaimer, the term of this patent is extended or adjusted under 35 U.S.C. 154(b) by 696 days.

(21) Appl. No.: 13/347,733

(22) Filed: Jan. 11, 2012

(65) Prior Publication Data

US 2013/0176175 A1  Jul. 11, 2013

(51) Int. Cl.
*G01S 1/00* (2006.01)
*G01S 5/02* (2010.01)
*G01S 1/68* (2006.01)
*G01S 3/40* (2006.01)
*F42B 12/38* (2006.01)

(52) U.S. Cl.
CPC .............. *G01S 5/0226* (2013.01); *G01S 1/68* (2013.01); *G01S 3/40* (2013.01); *F42B 12/385* (2013.01)

(58) Field of Classification Search
CPC ............... G01S 1/00; G01S 1/08; G01S 5/02; H04B 7/00
USPC ................................. 342/385, 386, 417, 367
See application file for complete search history.

(56) References Cited

U.S. PATENT DOCUMENTS

| | | | |
|---|---|---|---|
| 3,993,311 A | 11/1976 | Johnson | |
| 4,045,799 A * | 8/1977 | Dapiran | 342/419 |
| 4,277,069 A | 7/1981 | Rouse | |
| 4,528,566 A * | 7/1985 | Tyler | 342/419 |
| 4,557,243 A | 12/1985 | Eastman, II et al. | |
| 4,651,999 A | 3/1987 | Sturm | |
| 4,704,612 A | 11/1987 | Boy et al. | |
| 4,726,348 A | 2/1988 | Saunders | |
| 4,744,347 A | 5/1988 | Dodge | |
| 4,749,198 A | 6/1988 | Brailean | |
| 4,801,151 A | 1/1989 | Sturm et al. | |
| 4,836,557 A | 6/1989 | Polando | |
| 4,846,481 A | 7/1989 | Wageman | |
| 4,940,245 A | 7/1990 | Bittle, Jr. | |
| 4,955,356 A | 9/1990 | Pike et al. | |
| 4,976,442 A | 12/1990 | Treadway | |
| 5,143,044 A | 9/1992 | Bourquin | |
| 5,157,405 A | 10/1992 | Wycoff et al. | |

(Continued)

OTHER PUBLICATIONS

Trackmaster, Inc., "TrackMaster Electronic Arrow Tracking System", May 17, 2010, 7 pages.

*Primary Examiner* — Harry Liu
(74) *Attorney, Agent, or Firm* — Walter W. Duft (57) ABSTRACT

A signal-transmitting arrow operable to transmit an encoded RF signal, an arrow locating and game tracking receiver system for use with the signal-transmitting arrow, and a transmitter-nock unit for installation on an arrow to construct a signal-transmitting arrow. The arrow includes an arrow shaft, an arrow head disposed at an arrow shaft forward end, and a nock disposed at an arrow shaft rearward end. A transmitter unit includes a transmitter housing that is removably mounted in interior chamber at the rearward end of the arrow shaft, and is rigidly connected to the nock to provide the transmitter-nock unit. The transmitter unit has an RF transmitter with a rigid antenna that extends rearwardly into the nock. The receiver system includes omnidirectional and directional antennas and RF receivers, a processor for generating direction indicating signal, and a user interface that indicates arrow location.

35 Claims, 8 Drawing Sheets

(56) References Cited

U.S. PATENT DOCUMENTS

| | | | |
|---|---|---|---|
| 5,183,231 A | 2/1993 | Pellerin | |
| 5,450,614 A | 9/1995 | Rodriguez | |
| 5,609,147 A | 3/1997 | Withorn, Jr. | |
| 5,818,389 A * | 10/1998 | Lazar | 342/383 |
| 6,021,770 A | 2/2000 | Sodaro | |
| 6,059,677 A | 5/2000 | Breshears | |
| 6,151,308 A * | 11/2000 | Ibanez-Meier et al. | 370/316 |
| 6,238,310 B1 | 5/2001 | Morrison | |
| 6,390,642 B1 | 5/2002 | Simonton | |
| 6,409,617 B1 | 6/2002 | Armold | |
| 6,612,947 B2 | 9/2003 | Porter | |
| 6,705,808 B2 | 3/2004 | Kane | |
| 6,764,420 B2 | 7/2004 | Cyr et al. | |
| 6,814,678 B2 | 11/2004 | Cyr et al. | |
| 6,856,250 B2 | 2/2005 | Hilliard | |
| 6,909,964 B2 * | 6/2005 | Armstrong et al. | 701/482 |
| 7,300,367 B1 | 11/2007 | Andol et al. | |
| 7,632,199 B2 | 12/2009 | Kikos | |
| 7,922,609 B1 | 4/2011 | Hajari | |
| 8,041,333 B2 * | 10/2011 | Hansen et al. | 455/404.2 |
| 8,267,816 B1 | 9/2012 | Hajari | |
| 2005/0270234 A1 * | 12/2005 | Wolf et al. | 342/443 |
| 2009/0098958 A1 * | 4/2009 | Miner | 473/570 |
| 2012/0172158 A1 * | 7/2012 | Kirsch | 473/570 |

\* cited by examiner

APPARATUS FOR ARROW LOCATING AND GAME TRACKING

BACKGROUND

1. Field

The present disclosure relates to the sport of bow hunting. More particularly, the disclosure is directed to arrows with signal transmitting capability and to receiving equipment for use therewith to facilitate arrow locating and game tracking.

2. Description of the Prior Art

By way of background, hunting with a bow and arrow to take deer, elk, turkeys or other large game animals is quite popular. If the hunter shoots an arrow at an animal and misses, it is desirable to be able to locate and recover the arrow if possible. If an animal is shot and wounded with an arrow, the animal may flee in an attempt to escape from the point of impact. This requires that the animal be tracked, which can be difficult in darkness, rain, or snow, or if the animal is only slightly wounded and attempts to hide out.

Various tracking technologies have been proposed for locating a missing arrow and/or tracking an animal that has been wounded by an arrow. Such technologies include the use of radio frequency (RF) signaling in which a transmitter mounted on an arrow transmits a locating signal to a direction-finding receiver carried by the hunter. Although these RF locating/tracking devices are useful, applicants submit that improvements are needed in order to increase the effectiveness and usefulness of such technology.

SUMMARY

In one aspect of the disclosed subject matter, a signal-transmitting arrow is provided. The arrow includes an arrow shaft having a forward end and a rearward end. An interior chamber in the arrow shaft extends forwardly from the arrow shaft rearward end. An arrow head is disposed at the arrow shaft forward end and a nock is disposed at the arrow shaft rearward end. The nock has a forward end and a rearward end configured to engage a bow string. A transmitter unit has an RF transmitter and a power supply disposed within a transmitter housing having a forward end and a rearward end. The transmitter housing rearward end is rigidly attached to the nock forward end to form a rigid transmitter-nock unit. The transmitter housing has an exterior wall that is removably attached to an opposing interior wall of the arrow shaft that defines the arrow shaft interior chamber, such that the transmitter-nock unit is removable from the arrow shaft. A substantially rigid antenna unit extends rearwardly from the transmitter housing into the nock.

In an example embodiment, a hook device may be provided on the transmitter-nock unit that extends laterally beyond an exterior surface of the arrow shaft and is configured to snag on a target object if the arrow attempts to pass through the object. The arrow shaft may be electrically conductive in order to provide an antenna ground plane. According to this embodiment, the transmitter housing may be electrically connected to a ground of the transmitter and to the arrow shaft to provide an electrical pathway between the transmitter and the arrow shaft to establish the antenna ground plane. In a further embodiment, the transmitter unit may include an inertial power activation switch for activating the RF transmitter when the arrow is shot from a bow.

In another aspect of the disclosed subject matter, an arrow locating and game tracking receiver system is provided for use with a signal-transmitting arrow operable to transmit an encoded RF signal. The receiver system includes a first RF receiver, a second RF receiver, an omnidirectional antenna operatively coupled to the first receiver and a directional antenna operatively coupled to the second receiver. A user interface is operable to generate output information indicating a direction and relative distance of the arrow with respect to the receiver system. A processor is operatively coupled to receive an omnidirectional signal strength processor input from the first receiver on a first channel and a directional signal strength processor input from the second receiver on a second channel, and to send a processor output to the user interface. The processor is programmed to perform a calculation using the omnidirectional and directional signal strength processor inputs to generate the processor output, which is indicative of a direction and relative distance of the arrow.

In another aspect of the disclosed subject matter, a transmitter-nock unit is provided for installation on an arrow to construct a signal-transmitting arrow. The signal-transmitting arrow has an arrow shaft, an arrow head at a first end of the arrow shaft and a nock at a second end of the arrow shaft provided by the transmitter-nock unit. The transmitter-nock unit includes a nock having a forward end and a rearward end configured to engage a bow string, and a transmitter unit having a transmitter and a power supply disposed within a transmitter housing. The transmitter housing has a rearward end and a forward end, the transmitter housing rearward end being rigidly attached to the nock forward end. The transmitter housing has an exterior wall that is configured for removable attachment to an opposing interior wall of the arrow shaft that defines an arrow shaft interior chamber, such that the transmitter-nock unit is removable from the arrow shaft. A substantially rigid antenna unit extends rearwardly from the transmitter housing.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
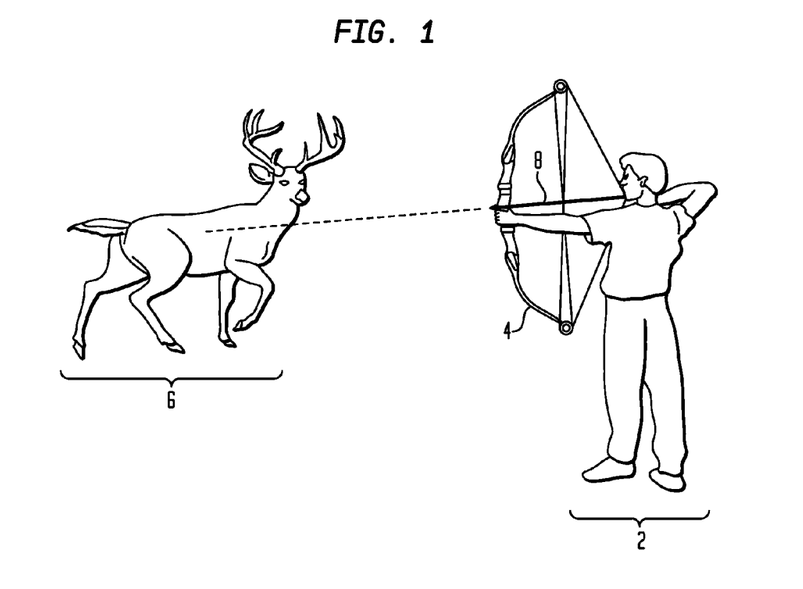
FIG. 1 is a diagram illustrating the act of hunting an animal with a bow and a signal-transmitting arrow.
Figure 2:
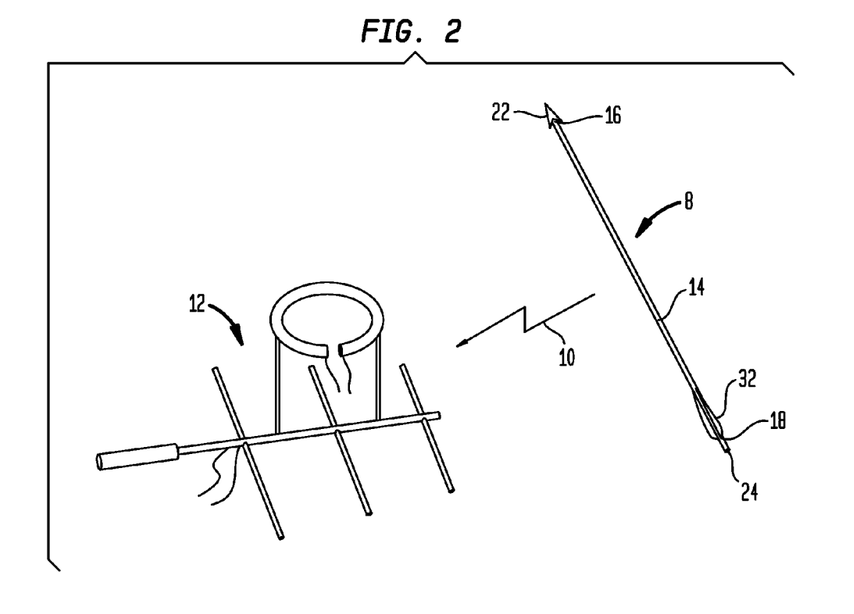
FIG. 2 is a diagrammatic illustration showing the signal-transmitting arrow of FIG. 1 and an arrow locating and game tracking receiver system for use with the signal transmitting arrow.

Turning now to the drawing figures, which are not necessarily to scale, like reference numbers will be used to represent like elements in all of the several views. FIG. 1 illustrates a hunter 2 using a conventional bow 4 to shoot an animal 6 with an arrow 8. As shown in FIG. 2, and as described in more detail below, the arrow 8 is constructed as a signal-transmitting arrow that transmits an RF (Radio Frequency) signal 10 that can be tracked by an arrow locating and game tracking receiver system 12 in order to locate the arrow 8 and/or track the animal 6 following a bow shot.

Figure 3:
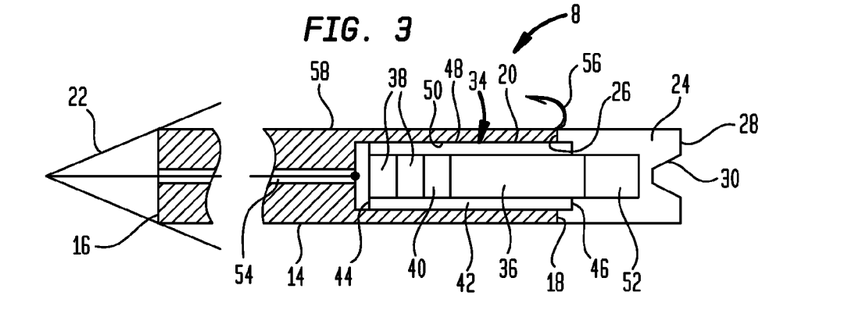
FIG. 3 is a diagrammatic cross-sectional side view of the signal-transmitting arrow of FIG. 1.

With additional reference now to FIG. 3, the arrow 8 includes an arrow shaft 14 having a forward end 16 and a rearward end 18. As can be seen in FIG. 3, an interior chamber 20 extends forwardly from the arrow shaft's rearward end 18 in order to receive a transmitter unit (see reference number 34 discussed below). If the arrow shaft 14 comprises a hollow tube as is commonly used for making arrows, the interior chamber 20 will extend for the entire length of the arrow shaft. If the arrow shaft 14 is solid, the interior chamber 20 may be formed at the rearward end 18 and may extend for a distance that is sufficient to accommodate the transmitter unit. An arrow head 22 is disposed at the arrow shaft's forward end 16. A nock 24 is disposed at the arrow shaft's rearward end 18. As can be seen in FIG. 3, the nock 24 has a forward end 26 and a rearward end 28, the latter being configured with a notch 30 to engage a bow string. As shown in FIG. 2, the arrow 8 also includes standard arrow fletching 32.

As further shown in FIG. 3, the transmitter unit (shown by reference number 34) is disposed within the arrow shaft's interior chamber 20. The transmitter unit 34 includes an RF transmitter 36 and a battery power supply 38, and may further include an inertial power activation switch 40, all of which are contained within a transmitter housing 42. The transmitter housing 42 has a forward end 44 and a rearward end 46, and is preferably formed from an electrically conductive material, such as a suitable metal. The shape of the transmitter housing 42 may be cylindrical, but other configurations could also be used. The transmitter housing's rearward end 46 is rigidly attached to the nock's forward end 25 to form a rigid transmitter-nock unit. The transmitter housing 42 has an exterior wall 48 that is removably attached to an opposing interior wall 50 of the arrow shaft that defines the arrow shaft interior chamber 20. Due to this removable attachment configuration, the transmitter-nock unit is removable from the arrow shaft 14, as by pulling it rearwardly out of the arrow shaft interior chamber 20. A substantially rigid antenna unit 52 extends rearwardly from the transmitter housing 42 into the nock 24. An antenna ground plane associated with the arrow shaft 14 extends forwardly from the transmitter housing 42. In particular, the arrow shaft 14 is preferably constructed from an electrically conductive material, such as aluminum, carbon, etc., such that the arrow shaft itself may serve as the antenna ground plane. In addition (or in the alternative), an electrically conductive element, such as a wire 54, may provide the antenna ground plane. In an example arrow construction described in more detail below, the arrow shaft 14 serves as a primary antenna ground plane and the wire 54 provides a secondary antenna ground plane in case the arrow shaft breaks. A hook device 56 may be optionally provided on the transmitter-nock unit. The hook device 56 is configured with one or more prongs that extend laterally beyond an exterior surface 58 of the arrow shaft 14 in order to snag on a target object, such as the animal 6 in FIG. 1, if the arrow 8 attempts to pass through the object.

Figure 4:
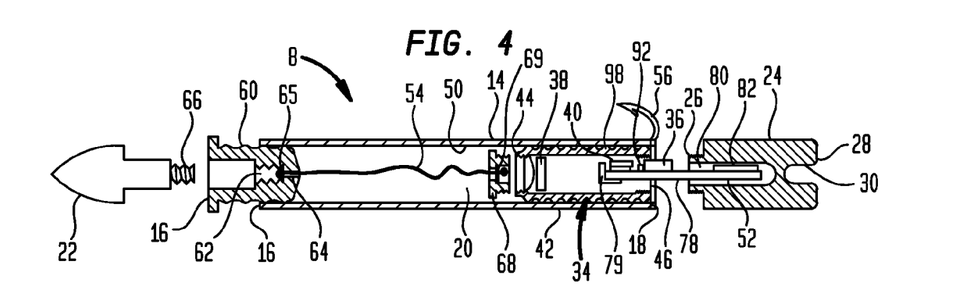
FIG. 4 is an exploded diagrammatic cross-sectional side view of the signal-transmitting arrow of FIG. 1.

Turning now to FIG. 4, an example construction of the arrow 8 is shown. As can be seen, the arrow shaft 14 comprises a hollow tube so that the interior chamber 20 extends the length of the arrow shaft. The arrow shaft's hollow tube is preferably electrically conductive in order to serve as a primary antenna ground plane (see above). The arrow head 22 can be mounted to the arrow shaft's forward end 16 using an arrow head insert 60, which may be considered part of the arrow head itself for purposes of the present disclosure. The insert 60 also serves to anchor the forward end of the wire 54 providing the secondary antenna ground plane. To that end, the insert 60 may be formed with a blind bore 62 that terminates at a small rearward aperture 64 that is sized to allow the wire 54 to pass through. The wire 54 may be secured at the base of the bore 62 by attaching the end of the wire to an anchoring device 65 (such as a washer) that is larger than the aperture 64, such that it cannot be pulled through the aperture. The insert 60 can be mounted to the forward end 16 of the arrow shaft 14 in any suitable manner, such as by press-fitting the insert into the arrow shaft's hollow interior. The insert 60 may have a suitable surface configuration (such as knurling) to help retain it in position. In order to secure the arrow head 22 to the insert 60, the bore 62 may be formed with female threads that engage male threads formed on a stem 66 of the arrow head. Other attachment schemes could also be used to mount the arrow head 16 to the insert 60.

Figure 5:
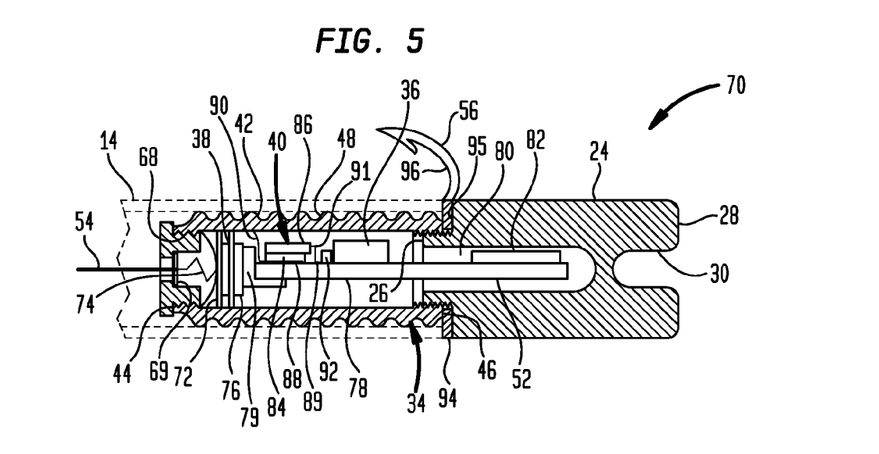
FIG. 5 is a diagrammatic cross-sectional side view of a transmitter-nock unit of the signal-transmitting arrow of FIG. 1.

With continuing reference to FIG. 4, the rearward end of the wire 54 may be mounted to an electrically conductive transmitter housing cap 68 attached to the forward end 44 of the transmitter housing 42. The same wire attachment technique used to secure the forward end of the wire 54 to the insert 60 may be used to secure the rearward end of the wire to the transmitter housing cap 68 (i.e., an aperture that receives the wire but captures a retainer 91 (e.g., a washer) attached to the end of the wire). The transmitter housing cap 68 can be removably mounted to the transmitter housing 34 in a suitable manner, such as by providing male threads on the cap and female threads on the transmitter housing's forward end 44 (or visa versa). Removing the transmitter housing cap 68 provides access to the interior of the transmitter housing 42, which is additionally illustrated in FIG. 5 in combination with the nock 24. FIG. 5 represents an embodiment 70 of the transmitter-nock unit mentioned above.

Directly behind the transmitter housing cap 68 is the battery power supply 38 that may be provided by one or more series-connected batteries. The electrical ground (e.g., negative) contact 72 of the power supply 38 may be electrically connected to the wire 54 by a short wire lead 74. The power (e.g., positive) contact 76 of the power supply 38 is electrically connected to the transmitter 36 and the inertial power activation switch 40 in the transmitter housing 42. These components are mounted on a printed circuit board (PCB) 78 that includes a power trace (see reference number 89 below) and a ground trace (see reference number 88 below). The PCB 78 includes a PCB power contact 79 that is electrically connected to the PCB power trace. The PCB 78 is positioned so that its PCB power contact mechanically (and electrically) engages the supply contact 76 when the power supply 38 is installed in the transmitter housing 42. From this point of contact, the PCB 78 extends rearwardly along the length of the transmitter housing 42 until it emerges from the transmitter housing's rearward end 46. The PCB 78 then continues rearwardly so that it extends into a central cavity 80 formed in the nock 34. An antenna 82 is mounted on this portion of the PCB 78 to form the antenna unit 52 that extends rearwardly into the nock 24.

The transmitter 36 may be mounted on the PCB 78 at any suitable location, such as near the rearward end 46 of the transmitter housing 42 so that it is easily connected to the antenna 82 (e.g, via an antenna trace (not shown) on the PCB 78). The inertial power activation switch 40 may be mounted on the PCB 78 near the power supply 38. The switch 40 may be constructed using a piezoelectric element 84 that mounts to the PCB 78 and a weight 86 that is mounted on top of the piezoelectric element 84. The piezoelectric element 84 rests on top of the PCB ground trace 88 and may be mechanically and electrically attached thereto using an electrically conductive adhesive. The ground trace 88 may be connected to the ground terminal 72 of the power supply 38 using a wire lead 90 that is attached to the transmitter housing 42 (which is electrically conductive). The electrical ground pathway thus includes the transmitter housing 42, and also extends through the transmitter housing cap 68 (which is also electrically conductive) to the wire lead 74 that connects to the ground contact 72 of the power supply 38. To provide a current pathway through the piezoelectric element 84, the weight 86 is made of a suitable electrically conductive material (such as metal or carbon) that may be bonded to the piezoelectric element using an electrically conductive adhesive. The weight 86 may then be electrically connected to the transmitter 36 via a wire lead 91, preferably in series with a large (e.g., 10 M Ohm) resistor (as described below in connection with FIG. 13). Alternatively, the weight 86 could itself be made from a resistive material. In this way, power from the power supply 38 will always maintained to the inertial power activation switch 40.

The inertial power activation switch 40 is sensitive to inertial forces that create shear stress between the weight 86 and the piezoelectric element 84. Such inertial forces are induced when the arrow 8 is shot from the bow 4 (and also when it strikes the animal 6). This results in the transmitter unit 34 being activated only when necessary in order to locate the arrow 8 or track the animal 6. Optionally, the transmitter unit 34 could also be awakened without an inertial force by providing a magnetic power activation switch 92. This would allow the transmitter unit 34 to be activated for testing purposes by bringing an external magnet into proximity to the magnetic power activation switch 92. The magnetic power activation switch 92 could also be used to turn off the transmitter unit 34 by again passing a magnet nearby.

With continuing reference to FIGS. 4 and 5, the rearward end 46 of the transmitter housing 42 may be attached to the forward end 26 of the nock 24 using a threaded connection. For example, as shown in FIG. 4, the nock's forward end 26 may be formed with male threads that engage female threads formed on the transmitter housing's rearward end 46 (or visa versa). Alternatively, a mold/pressed technology may be used to provided the desired connection, as could any number of other mounting technologies. Note that the nock 24 will typically comprise a polymeric material, although other materials could also be used. The hook device 56, which may be formed from metal or plastic, can be mounted by capturing it between the transmitter housing 42 and the nock 24. For example, in the transmitter-nock unit 70 of FIG. 5, the hook device 56 comprises a thin ring-shaped base 94 (e.g., a washer) that is sandwiched between the transmitter housing's rearward end 46 and a shoulder 95 recessed from the nock's forward end 26. A protruding hook portion 96 of the hook device 56 (which may be shaped like a fish hook with one or more prongs) extends from the base 94.

The transmitter housing 42 can be sized to fit snugly in the arrow shaft's interior chamber 20, so that its exterior wall 48 frictionally engages the arrow shaft's interior wall 50, such as by way of an interference fit. This will provide interfacial contact between the conductive transmitter housing 42 and the conductive arrow shaft 14 in order to maintain a good electrical connection these components, thereby allowing the arrow shaft to serve as a primary antenna ground plane. As shown in FIG. 4, a surface configuration 98, such as knurling, could be formed on the transmitter housing's exterior wall 48. Alternatively, a mechanical connector such as an electrically conductive compression spring (not shown) could be used to mechanically connect the transmitter housing 42 (and therefore the transmitter-nock unit 70) to the arrow shaft 14. If the arrow shaft 14 is of a size that is too large for the transmitter housing 42, an electrically conductive mechanical adapter (such as a tubular shim) could be sandwiched between these components to provide the required interfacial engagement that retains the transmitter housing in place. In that case, the exterior wall 48 of the transmitter housing would engage the interior wall of the shim, and the exterior wall of the shim would engage the interior wall 50. In all of the above configurations, a holding force of about 4-6 pounds may be used so that the transmitter housing 42 is secure within the arrow shaft 14, but is removable therefrom.

Figure 6:
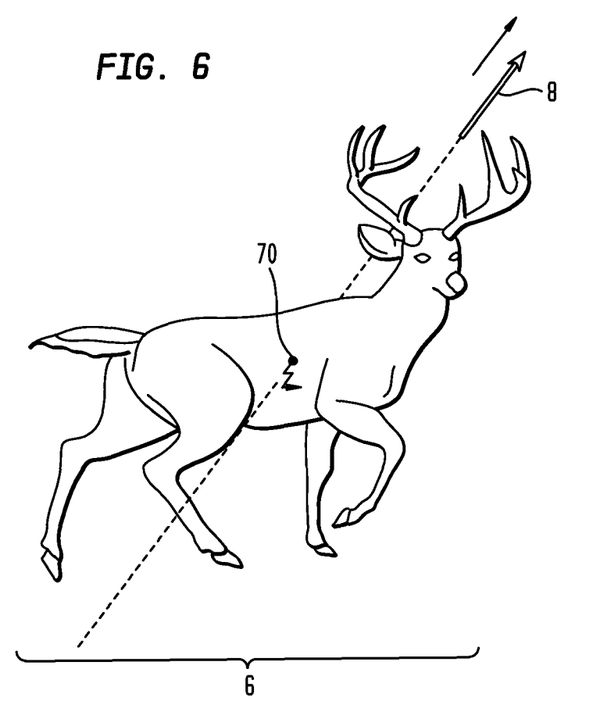
FIG. 6 is a diagram illustrating operation of the signal-transmitting arrow of FIG. 1 when it passes through an animal.

The advantage of removably attaching the transmitter housing 42 (and therefore the transmitter-nock unit 70) to the arrow shaft 14 is to ensure that it remains attached to an intended target, such as the animal 6, when the arrow 8 is shot from the bow 4. In particular, as shown in FIG. 6, the arrow 8 may travel with such force that it passes entirely through the animal 6. Should this happen, the transmitter-nock unit 70 will be stopped by the hook device 56 as it engages the surface of the intended target. This may stop the arrow 8, but even if it does not, and the arrow continues its forward progress, the arrow will separate from the transmitter-nock unit 70, leaving the latter in contact with the target. Note that the antenna ground plane provided by the arrow shaft 14 will no longer be present. However, the wire 54 will then act as the antenna ground plane, provided its rearward end remains attached to the transmitter housing cap 68 and its forward end breaks away from the insert 60 that mounts the arrow head 16. This may accomplished by selecting the wire 54 and its connection to the transmitter housing cap 68 to be relatively strong in comparison to the strength of the connection between the wire and the insert 60.

Figure 7:
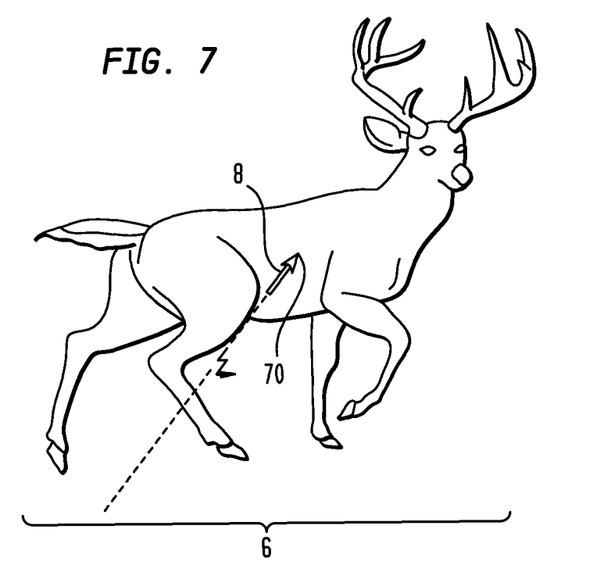
FIG. 7 is a diagram illustrating operation of the signal-transmitting arrow of FIG. 1 when it is partly inserted in an animal.
Figure 8:
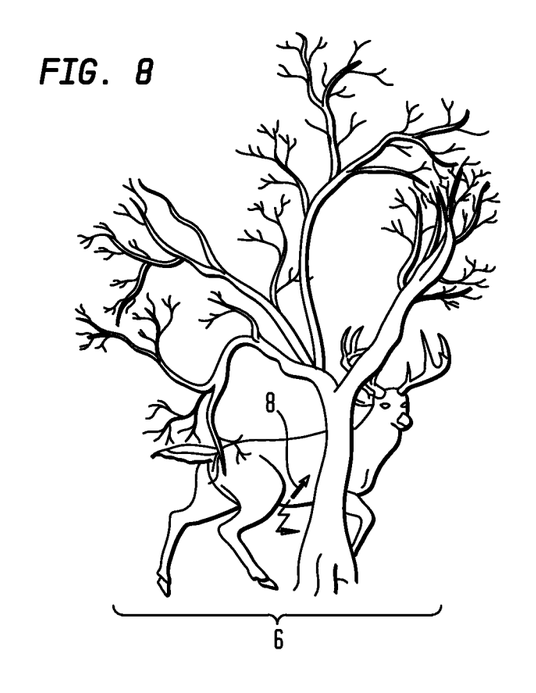
FIG. 8 is a diagram illustrating operation of the signal-transmitting arrow of FIG. 1 when it is partly inserted in an animal and about to be broken by the animal.
Figure 9:
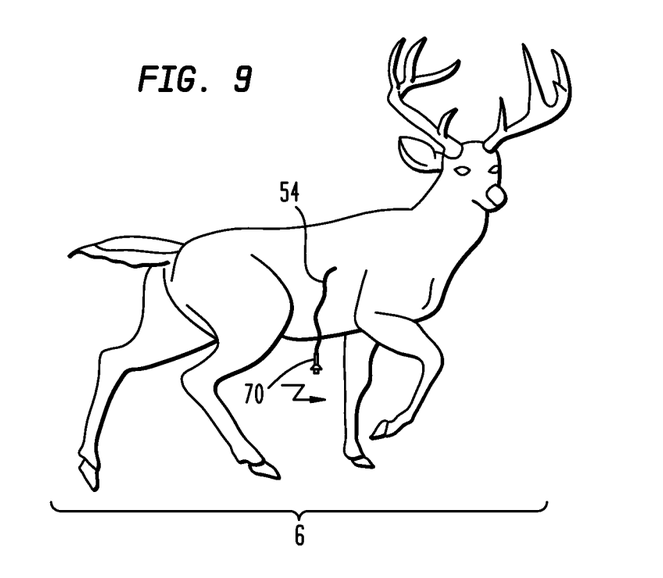
FIG. 9 is a diagram illustrating operation of the signal-transmitting arrow of FIG. 1 after it has been broken by an animal.

The secondary antenna ground plane provided by the wire 54 will also be of use if the arrow shaft 14 is broken. For example, as shown in FIG. 7, instead of passing through a target such as the animal 6, the arrow 14 may extend partly out of the animal following a bow shot. In some cases, the animal 6 may attempt to break off the protruding portion of the arrow 14 when fleeing the point of impact, such as by rubbing against trees or other brush, as shown in FIGS. 8 and 9. In that case, the arrow shaft 14 will no longer function as an antenna ground plane. However, the wire 54 will provide the antenna ground plane assuming it remains connected to the transmitter housing cap 68 and the insert 60.

Figure 10:
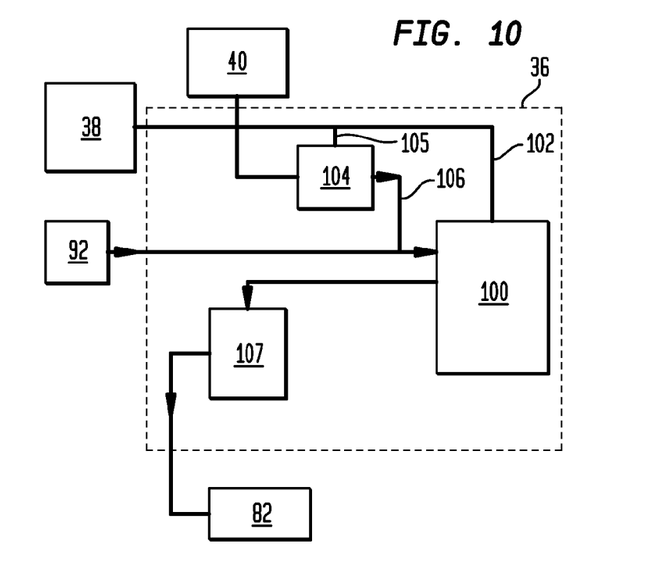
FIG. 10 is a functional block diagram showing example components of the arrow of FIG. 1.
Figure 11:
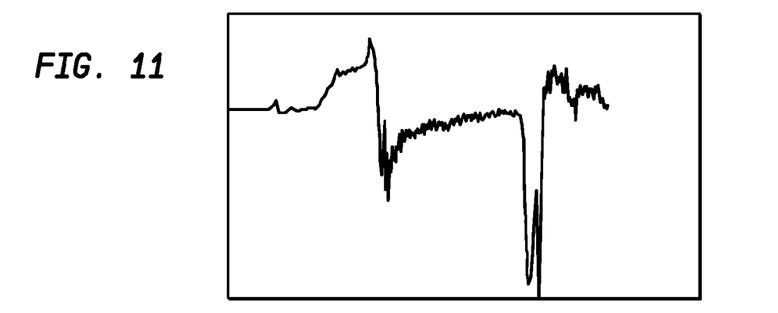
FIG. 11 is a graph showing acceleration of the signal-transmitting arrow of FIG. 1.
Figure 12:
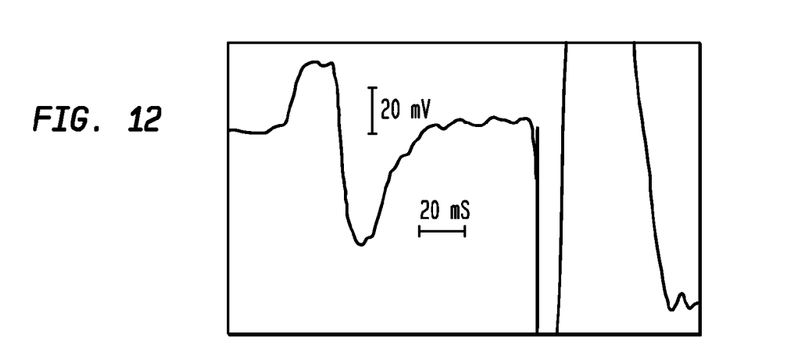
FIG. 12 is a graph showing band filtered velocity of the signal-transmitting arrow of FIG. 5.

Turning now to FIG. 10, the functional components of the transmitter 36 are shown diagrammatically. The power supply 38 supplies constant power to a processor 100 via circuit path 102 and to a band-pass filter integrator 104 via circuit path 105. As previously described, the power supply 38 also supplies constant power to the power activation switch 40 (this connection is not shown in FIG. 10). The latter component controls the wake-up state of the processor 100 due to the processor being programmed to assume a low-power mode until it is awakened. Processor wake-up occurs when the arrow 8 passes the bow 4 during a shot. Due to the inertial force delivered to the arrow 8, the piezoelectric element 84 of the inertial power activation switch 40 will be energized to create a voltage signal whose magnitude correspond to the arrow's acceleration. Rather than delivering the output of the piezoelectric element 84 directly to the processor 100, the piezoelectric signal is first filtered and integrated by the band-pass filter integrator 104, and then delivered to the processor 100 via circuit path 106 as a processor wake-up signal. The band-pass filter integrator 104 provides optimal filtration of the noisy piezoelectric signal that represents acceleration of the arrow 8 (e.g., in the direction of travel), and the signal is integrated to indicate velocity of the arrow (e.g., in the direction of travel). The band-pass filtering and integration of the piezoelectric signal minimizes the possibility of random transmitter activation, such as during transportation of the arrow 8 or by mistakenly dropping it on the ground, etc. FIG. 11 shows a first example plot of signal amplitude vs. time, representing a raw unfiltered arrow acceleration signal output by the piezoelectric element 84. FIG. 12 shows a second example signal representing the first signal after it has passed through the band-pass filter integrator 104. This signal represents the filtered arrow velocity, which is more stable than the unfiltered non-integrated first signal that may typically include noise and random mechanical artifacts. Use of the second filtered signal will thus help ensure that the processor 100 is only activated when activation is desired, such as when shooting the arrow 8.

Figure 13:
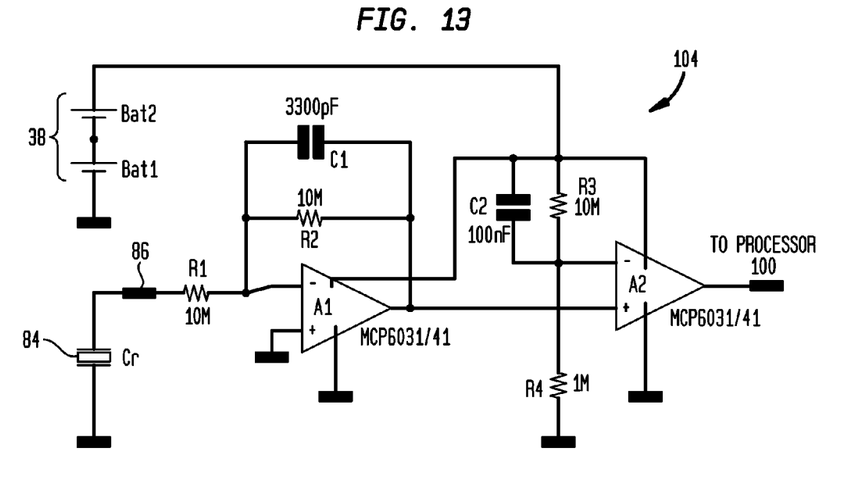
FIG. 13 is a schematic circuit diagram showing an example construction of a band-pass filter integrator component of the signal-transmitting arrow of FIG. 1.
Figure 14:
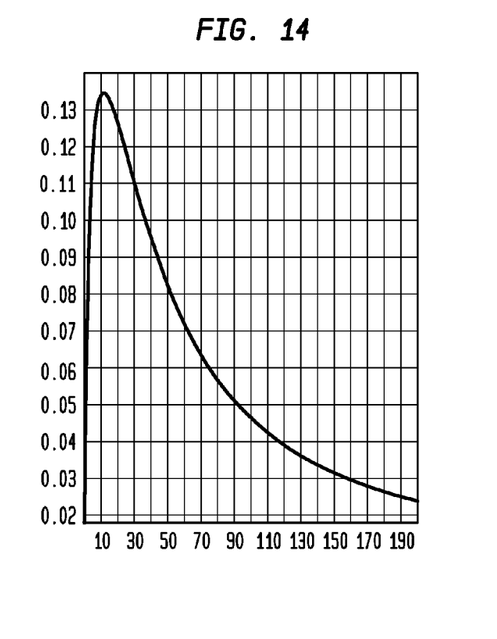
FIG. 14 is a graph showing an example frequency response of the band-pass filter integrator of FIG. 13.

FIGS. 13 and 14 respectively illustrate an example construction of the band-pass filter integrator 104 and its frequency response. The band-pass filter integrator 104 in FIG. 13 is powered by a pair of series-connected batteries Bat1 and Bat2 that comprise the power supply 38. The piezoelectric element 84 of the inertial power activation switch 40 is represented by piezoelectric crystal Cr, and the weight 86 of switch 40 is also shown. Resister R1 is the 10 M Ohm resister discussed above that delivers connects to the weight 86. Operational amplifier A1 provides the band-pass filtering and integration functions. The piezoelectric signal from piezoelectric element 84 reaches the inverting input of operational amplifier A1 through resistor R1. The non-inverting input of operational amplifier A1 is grounded. The presence of the parallel combination of capacitor C1 and resistor R2 in the feedback loop from the output of operational amplifier A1 to its inverting input produces frequency-dependent feedback. It may be determined using basic circuit principles that the voltage gain G of operational amplifier A1 is a function of the reactance/resistance of C1/R2 in parallel combination divided by the resistance of resistor R1, such that higher frequencies will be attenuated to produce low-pass filtering. It may also be determined that the voltage at the output of operational amplifier A1 is a function of integrating the input voltage with respect to time, such that signal integration is provided. Operational amplifier A2 provides a comparator that receives the output of operational amplifier A1 at its non-inverting input and compares it to a threshold voltage at its inverting input. The threshold voltage represents the power supply voltage (provided by power supply 38) reduced by the R3-R4 voltage divider. The capacitor C2 ensures that the transmitter 36 remains switched off when the batteries Bat1 and Bat2 are installed or replaced. FIG. 14 graphs the transfer coefficient for output of operational amplifier A1 versus its input received from the piezoelectric element 84 as a function of frequency. As shown, maximum output is obtained approximately 12.5 Hz. The circuit of FIG. 13 could also be designed to maximize its output at other low-pass frequencies.

Returning now to FIG. 10, the processor 100 also receives wake-up signals from magnetic power activation switch 92. The switch 92 may also be used to power down the processor 100 after use, regardless of how it was powered-up. The processor 100 may be implemented using any suitable type of logic-implementing device, including but not limited to a programmed microprocessor, an FPGA (Field Programmable Gate Array), an ASIC (Application Specific Integrated Circuit), etc. In an example embodiment, the processor 100 may be provided by one of the PIC family of microcontrollers from Microchip Technology Inc. (such as the PIC10F200 microcontroller). When awakened by either the inertial power activation switch 38 or the magnetic power activation switch 92, the processor 100 is programmed to activate an RF chip transmitter 107 and periodically (e.g., once per second) output digitally encoded data to the transmitter for transmission as an encoded RF signal. The processor may further be programmed to power off after a predetermined period of time or in response to a signal from the magnetic power activation switch 92. Alternatively, the processor 100 could be programmed to remain on until signaled by the magnetic power activation switch 92.

The RF chip transmitter 107 receives the digitally encoded data from the processor 100 and delivers the encoded RF signal to the antenna 82. The chip transmitter 107 may be implemented by any suitable RF transmitter device that meets the size constraints imposed by the arrow shaft 14 and which is capable of modulating an RF carrier to so as to wirelessly transmit the digitally encoded information provided by the processor 100. In an example embodiment, the chip transmitter 107 is a Micrel MICRF113 transmitter from Micrel Inc. This transmitter is a single-chip ASK (Amplitude Shift Keying) transmitter integrated circuit designed for remote wireless applications in the 300-450 MHz range.

The digitally encoded data output by the processor 100 to the chip transmitter 107 is selected to identify the arrow 8 being used by the hunter 2 (see FIG. 1) and distinguish it from other arrows used by other hunters. Several different codes could be used to identify different arrows belonging to members of a group of hunters. In this way, the tracking of one hunter's arrows could be distinguished from the tracking of other hunters' arrows by listening for a particular code of interest. To support the use of different arrow codes assigned to different hunters, the code associated with each hunter's arrows could be identified using a particular color scheme (e.g., white, black, red, yellow, etc.) for the nock portion of each hunter's transmitter-nock unit 70.

Figure 15:
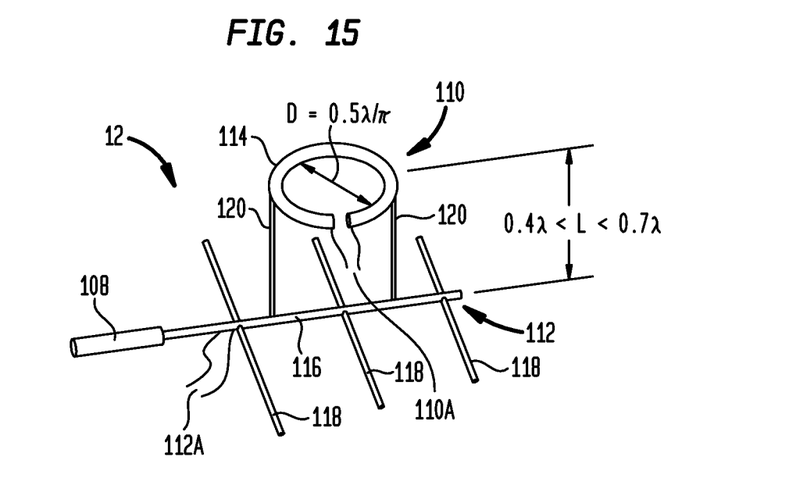
FIG. 15. is a perspective view showing the arrow locating and game tracking receiver system of FIG. 2.

Turning now to FIG. 15, the arrow locating and game tracking receiver system 12 that was briefly introduced in FIG. 1 is shown. As can be seen, the receiver unit 12 includes a hand-held base unit 108, an omnidirectional antenna 110, and a directional antenna 112. The omnidirectional antenna 110 may be constructed as an omnidirectional ring element 114 made of tubular material. The directional antenna 112 may be constructed as a Yagi antenna having a central support spine 116 extending out of the base unit 108. The spine 116 carries plural tubular bars 118 that are perpendicular to the spine and parallel to each other. The directional antenna 112 may be of the popular 3-bar or 5-bar Yagi type, with one of the bars being the driven element, another being the reflector, and the remaining bar(s) serving as (a) director(s).

The omnidirectional antenna 110 has a ring diameter that is approximately $0.5\lambda/\pi$ where $\lambda$ is the wavelength transmitted by the arrow 8. The omnidirectional antenna 110 is oriented in a first plane and the directional antenna 112 is oriented in a second plane that is substantially parallel to the first plane. The omnidirectional antenna is mounted to the spine 116 of the directional antenna 112 by non-conductive (e.g., plastic) isolator holders 120. The length of the holders 120 is chosen so that the first plane is spaced from the second plane by a spacing distance L that is wavelength dependent. For example, a spacing of approximately $(0.4 \times \lambda) < L < (0.7 \times \lambda)$ may be used. As shown in FIG. 15, the antenna leads 110A of the omnidirectional antenna may be connected to a side of the omnidirectional ring element 114 that is offset from the directional antenna's spine 116, and may extend from the omnidirectional ring element in a direction that is substantially parallel to the directional antenna bars 118. The directional antenna output leads 112A are also illustrated. Although not shown, both sets of leads 110A and 112A ultimately route back to the base unit 108.

Figure 16:
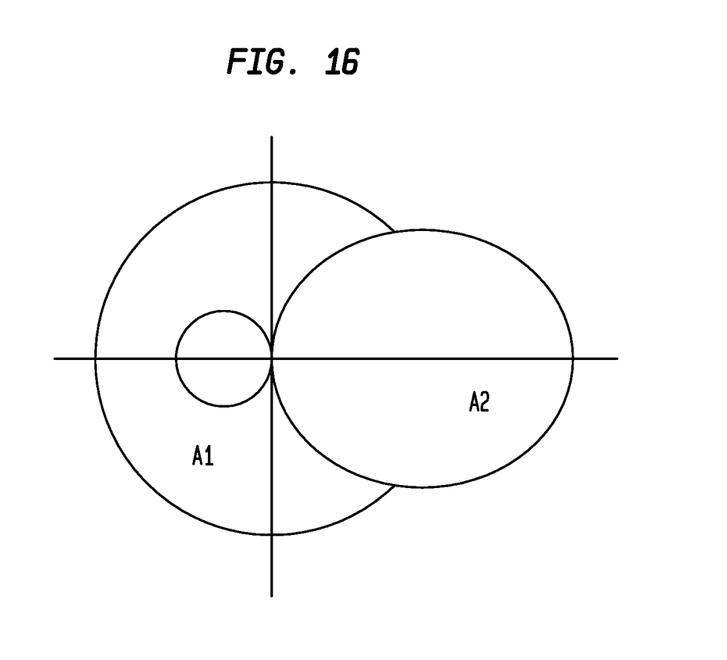
FIG. 16 is a polar antenna diagram showing horizontal signal polarization characteristics of directional and omnidirectional antenna portions of the arrow locating and game tracking receiver system of FIG. 2.

The directional diagrams for the omnidirectional antenna 110 and the directional antenna 112 are superimposed on each other in FIG. 16. Diagram A1 shows the horizontal signal polarization characteristics of the omnidirectional antenna and diagram A2 shows the horizontal signal polarization characteristics of the directional antenna. The omnidirectional antenna 110 outputs a signal that does not depend on the orientation of receiver system 12 in a hunter's hands. Conversely, the directional antenna 112 outputs a signal that does depend on the orientation of the receiver system 12.

Figure 17:
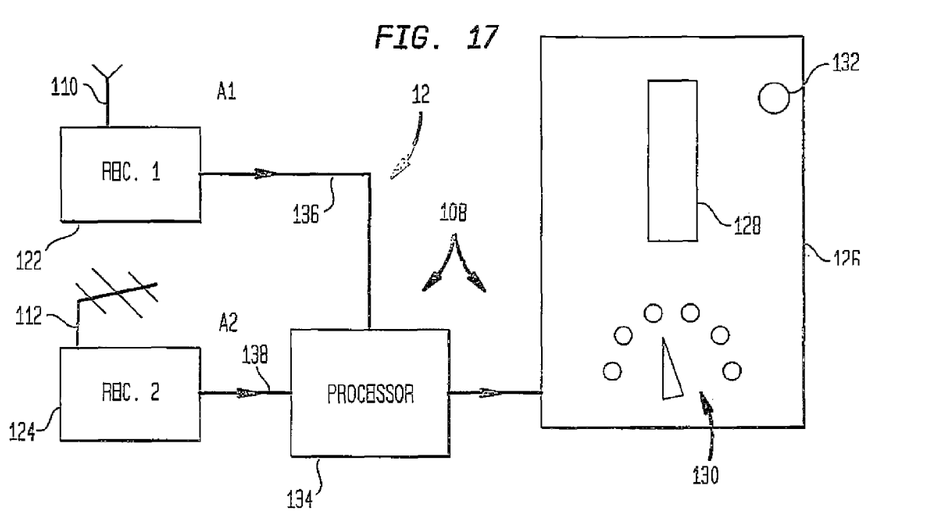
FIG. 17 is a functional block diagram showing components of the arrow locating and game tracking receiver system of FIGS. 2.

Turning now to FIG. 17, the base unit 108 is designed to be held in the hand of a person tracking an arrow 8. It may be used to house a first RF receiver 122 operatively coupled to the omnidirectional antenna 110 and a second RF receiver 124 operatively coupled to the directional antenna 112. The base unit 108 may further be used to house a user interface 126 that includes a visual display 128 and/or an audio output device (e.g., such as speaker 164 shown in FIG. 18). As can be seen in FIG. 17, one way that the display 128 may be implemented is as a bar graph display or meter. However, various other types of displays, both digital and/or analog, could also be used. The user interface 126 is thus operable to generate output information (e.g., visual, audible or both) indicating a direction and relative distance of an arrow with respect to the receiver system. The user interface 126 also allows includes a selector switch 130 that allows a user to select different arrow codes for separately tracking the arrows 8 of individual hunters 2 (see FIG. 1). A receiver system power switch 132 may also be provided by the user interface 126.

A processor 134 is operatively coupled to receive an omnidirectional signal strength processor input from the first receiver 122 on a first channel 136 and a directional signal strength processor input from the second receiver 124 on a second channel 138, and to send a processor output to the user interface 126. As described in more detail below, the processor 134 is programmed to perform a calculation using the omnidirectional and directional signal strength processor inputs to generate the processor output, which is indicative of a direction and relative distance of an arrow 8 from the receiver system 12. Note that as an alternative to the foregoing arrangement of components in the base unit 108, one of more of the RF receivers 122 and 124, the user interface 126 and/or the processor 134 could be located in a secondary enclosure (not shown).

Figure 18:
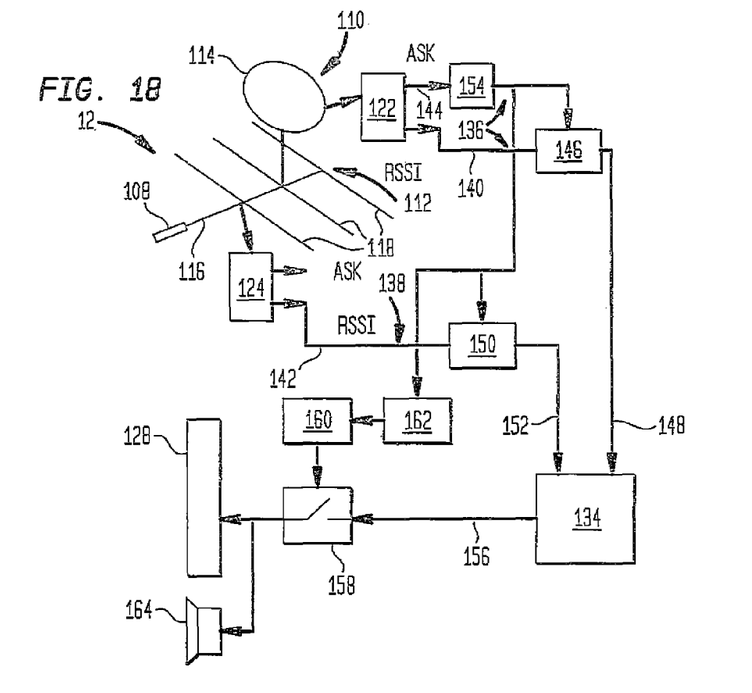
FIG. 18 is a functional block diagram showing additional components of the arrow locating and game tracking receiver system of FIG. 2.

Turning now to FIG. 18, the first receiver 122 generates an omnidirectional signal strength receiver output 140 into the first channel 136. This first receiver output represents the direction-independent signal strength of an arrow's encoded RF signal. The second receiver 124 generates a directional signal strength receiver output 142 into the second channel 138. This second receiver output represents a direction-dependent signal strength of the arrow's encoded RF signal. The first and second receiver outputs 140 and 142 may comprise RSSI (Received Signal Strength Indicator) measurements of the power present in an RF signal received from an arrow 8. The first receiver 122 (or alternatively the second receiver 124) also generates an encoded receiver output 144 representing an encoding value extracted from said arrow's encoded RF signal. This third receiver output 144 is produced by demodulating the arrow's signal. By way of example, the third receiver output 144 could be generated using ASK demodulation if the arrow's encoded RF signal is generated using Ask modulation. The first receiver 122 and the 124 may be implemented using any suitable RF receiver capable of generating the required outputs 140, 142 and 144. In an example embodiment, each receiver 122 and 124 may be provided by a Micrel MICRF220 receiver chip sold by Micrel, Inc. The MICRF220 receiver is a 300-450 MHz super-heterodyne, image-rejecting, RF receiver that provides ASK demodulation and an analog RSSI output.

The first channel 136 emanating from the first receiver 122 may include a first sample-and-hold circuit 146 operable to store the omnidirectional signal strength receiver output 140 and present it to the processor 134 as an omnidirectional signal strength processor input 148. The second channel 138 may include a second sample-and-hold circuit 150 operable to store the directional signal strength receiver output 142 and present it to the processor 134 as a directional signal strength processor input 152. In an example embodiment, the sample-and-hold circuits 146 and 150 may each be provided by a National Semiconductor LF198 monolithic sample and hold circuit sold by National Semiconductors, Inc. In alternative embodiments, the sample-and-hold functions could be performed by the processor 134 itself without the use of the separate sample-and-hold circuits 146 and 150. A decoder 154 is operable to decode the third receiver output 144 and inspect its value. If the code matches a predetermined encoding value corresponding to an arrow 8 being located (which may be set using the selector 130 of FIG. 17), the decoder 154 will activate the first and second sample-and-hold circuits 146 and 150 to capture the first and second receiver outputs 140 and 142.

The processor 134 may be implemented using any suitable type of logic-implementing device, including but not limited to a programmed microprocessor, an FPGA (Field Programmable Gate Array), an ASIC (Application Specific Integrated Circuit), etc. In an example embodiment, the processor 134 may be provided by one of the PIC family of microcontrollers from Microchip Technology Inc. (such as the PIC16C781 or PIC18C1622 microcontroller). This programmable device includes both ADC (Analog Digital Conversion) and DAC (Digital Analog Conversion) capability. The processor 134 performs ADC on the omnidirectional and directional signal strength processor inputs 148 and 152 and performs a calculation determine a value D that represents a direction-dependent signal strength value. After calculating D, the processor 134 performs DAC to produce a corresponding analog processor output 156 that can be used to drive the user interface 126. The direction-dependent signal strength value D may be determined using the relationship:

$$D=(D_{max})(K_o/K_{dmax})(A_d/A_o),$$

where $D_{max}$ is a maximum value of D to be presented by the user interface, $K_o$ is an internal omnidirectional antenna gain value, $K_{dmax}$ is an internal maximum directional antenna gain value, $A_d$ is the magnitude of the directional signal strength processor input 152 and $A_o$ is the magnitude of the omnidirectional signal strength processor input 148. As can be seen from the above equation, the signal strength value D is completely direction dependent because it is proportional to the ratio of the directional signal strength $A_d$ to the omnidirectional signal strength $A_o$. In other words, the signal strength value D indicates arrow direction only, not arrow proximity. The magnitude of the change in D caused by a change in arrow direction is set by selecting the gain values $K_o$ and $K_{dmax}$.

The analog processor output 156 representing the direction-dependent signal strength value D is presented to a first input of a multiplexer 158. A second input to the multiplexer 158 is provided by a monostable multivibrator 160 that is in turn driven by a delay unit 162. The delay unit 162 is triggered by the decoder 154 at the same time that the decoder activates the sample and hold circuits 146 and 150. The purpose of the delay is to allow the processor 134 sufficient time to perform its ADC conversions on the processor inputs 148/152, calculate D, perform an DAC conversion on D and generate the processor output 156, before activating the user interface 128. Once the delay unit 162 has waited a predetermined interval, it triggers the monostable multivibrator 160 to produce a short duration pulse (e.g., 0.2 seconds) that in turn causes the multiplexer 158 to deliver the processor output 156 to the user interface 128 during the same time period. In an example embodiment, the multiplexer 158 may be provided by an Analog Devices ADG1202 CMOS switch from Analog Devices, Inc., and the monostable multivibrator 160 may be provided by a Linear Technology LTC6993 monostable pulse generator from Linear Technology Corporation. As previously discussed in connection with the arrow 8, the arrow's processor 100 can be programmed to drive the chip transmitter 107 to transmit an RF encoded signal at a selected interval, such as once per second. In that case, the user interface 128 will output a short duration visual or audible signal every time the arrow's RF encoded signal is received by the receiver unit 12.

As indicated above, the user interface comprises one or both of a visual signal strength output device or an audible signal strength output device. FIG. 18 shows the visual display 128 and also a speaker 164 that serves as an audio output device. When a hunter 2 uses the receiver system 12 to locate an arrow 8, the he/she will hold the base unit 108 and orient it so that the elements of the omnidirectional antenna 110 and the directional antenna 112 are all parallel to the ground. Using the spine 116 of the directional antenna 112 as a pointer, the hunter will then rotate the base unit 108 to point the directional antenna 112 in different directions while observing changes in the visual output of the display 128 and/or tones from the speaker 164 to monitor the direction dependent signal level D calculated by the processor 134. The correct direction of the arrow 8 is indicated when the visual and/or audible output representing the signal strength level D becomes close to Dmax. Advantageously, based on the manner in which D is calculated, the correct direction will be indicated independently of distance to the arrow (animal), lay of the land, weather or other conditions. This may be explained by the fact that the first and second receiver outputs 140 and 142 respectively represent the strength of omnidirectional and directional signals received by the receivers 122 and 124 under the same conditions and with the same antenna polarization. As such, the ratio of the omnidirectional and directional signal strengths represented by D will depend only on the direction to the arrow 8. Even though both signal levels might vary due to many factors, they will vary together such that their ratio does not change except due to rotation of the receiver system 12 when seeking the arrow 8. In other words, all signal strength factors applied to the omnidirectional antenna 110 and the directional antenna 112 simultaneously change the antenna gain seen by both receivers 122 and 124. This characteristic of the receiver system 12 provides an effective tool for locating an arrow 8 (and tracking an animal 6) independently of weather, distance or area (terrain) conditions.

Accordingly, a signal-transmitting arrow and a transmitter-nock unit therefor, as well as an arrow locating and game tracking receiver system, have been disclosed. Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A signal-transmitting arrow, comprising:
an arrow shaft having a forward end and a rearward end;
an interior chamber in said arrow shaft that extends forwardly from said arrow shaft rearward end;
an arrow head disposed at said arrow shaft forward end;
a nock disposed at said arrow shaft rearward end, said nock having a forward end and a rearward end configured to engage a bow string;
a transmitter unit having an RF transmitter and a power supply disposed within a transmitter housing;
said transmitter housing having a forward end and a rearward end, said transmitter housing rearward end being rigidly attached to said nock forward end to form a rigid transmitter-nock unit;
said transmitter housing having an exterior wall that is removably attached to an opposing interior wall of said arrow shaft that defines said arrow shaft interior chamber, such that said transmitter-nock unit is removable from said arrow shaft; and
a substantially rigid antenna unit extending rearwardly from said transmitter housing into said nock.

2. The arrow of claim 1, wherein said antenna unit extends rearwardly into an interior cavity in said nock.

3. The arrow of claim 2, wherein said antenna unit is mounted on a circuit board that also mounts said transmitter.

4. The arrow of claim 1, wherein said transmitter housing and said arrow shaft are electrically conductive, and wherein said transmitter housing is electrically connected to a ground of said transmitter and to said arrow shaft to provide an electrical pathway between said transmitter and said arrow shaft, so that said arrow shaft provides an antenna ground plane.

5. The arrow of claim 4, wherein said ground plane further includes an electrical conductor disposed within said arrow shaft in case said arrow shaft breaks.

6. The arrow of claim 5, wherein said electrical conductor comprises a wire connected at a first end thereof to a transmitter housing cap at said forward end of said transmitter housing and at a second end thereof to an arrow-holding insert at said arrow shaft forward end.

7. The arrow of claim 1, wherein said transmitter housing is removably attached to said arrow shaft by way of frictional or mechanical engagement of said transmitter housing exterior wall with said arrow shaft interior wall.

8. The arrow of claim 1, wherein said transmitter housing is attached to said nock using a mechanical connection.

9. The arrow of claim 8, wherein said mechanical connection comprises a threaded connection.

10. The arrow of claim 8, further including a hook device on said transmitter-nock unit extending laterally beyond an exterior surface of said arrow shaft and configured to snag on a target object if said arrow attempts to pass through said object hook, said hook device being captured between said transmitter housing and said nock.

11. The arrow of claim 1, wherein said transmitter housing forward end comprises an opening covered by a transmitter housing cap, and wherein said power source comprises one or more batteries that are removable via said opening when said removable cap is opened.

12. The arrow of claim 1, wherein said transmitter unit further includes an inertial power activation switch operable to deliver power for RF transmission in response to said arrow being shot from a bow.

13. The arrow of claim 12, wherein said inertial power activation switch comprises an inertial sensor that generates a first signal indicating acceleration of said arrow and a bandpass filter/integrator that filters and integrates said first signal to remove noise components and generate a second signal that indicates velocity of said arrow.

14. The arrow of claim 13, wherein said inertial activation switch includes a piezoelectric sensor.

15. The arrow of claim 12, wherein said transmitter unit further includes a magnetic power activation switch.

16. The arrow of claim 1, wherein said transmitter unit further includes a processor, said processor being operable to generate encoded data that is transmitted by said transmitter as an encoded RF signal that is unique relative to other transmitter units in other arrows of like design so that said arrow may be distinguished from said other arrows.

17. The arrow of claim 11, wherein said nock is color coded to indicate that said transmitter generates a particular encoded signal.

18. An arrow locating and game tracking receiver system for use with a signal-transmitting arrow operable to transmit an encoded RF signal, said receiver system comprising:
a first RF receiver;
a second RF receiver;
an omnidirectional antenna operatively coupled to said first receiver;
a directional antenna operatively coupled to said second receiver;
a user interface operable to generate output information indicating a direction and relative distance of said arrow from said receiver system;
a processor operatively coupled to receive an omnidirectional signal strength processor input from said first receiver on a first channel and a directional signal strength processor input from said second receiver on a second channel, and to send a processor output to said user interface;
said processor being programmed to perform a calculation using said omnidirectional and directional signal strength processor inputs to generate said processor output, said processor output being indicative of a direction and relative distance of said arrow.

19. The receiver system of claim 18, wherein:
said first receiver generates an omnidirectional signal strength receiver output into said first channel, said omnidirectional signal strength receiver output representing a direction-independent signal strength of said arrow's encoded RF signal;
said second receiver generates a directional signal strength receiver output into said second channel, said directional signal strength receiver output representing a direction-dependent signal strength of said arrow's encoded RF signal; and
said first receiver or said second receiver generates an encoded receiver output representing an encoding value extracted from said arrow's encoded RF signal.

20. The receiver system of claim 19, wherein:
said first channel comprises first sample-and-hold circuit operable to store said omnidirectional signal strength receiver output and present it to said processor as said omnidirectional signal strength processor input;
said second channel comprises a second sample-and-hold circuit operable to store said directional signal strength receiver output and present it to said processor as said directional signal strength processor input; and
said receiver system further including a decoder operable to decode said third receiver output and activate said first and second sample-and-hold circuits if said encoded receiver output matches a predetermined encoding value corresponding to said arrow.

21. The receiver system of claim 18, wherein said processor calculates said processor output from said omnidirectional and directional signal strength processor inputs using the relationship:

$$D = (D_{max})(K_o/K_{dmax})(A_d/A_o),$$

where D is said processor output, $D_{max}$ is a maximum value of D to be presented by said user interface, $K_o$ is an omnidirectional antenna gain value, $K_{dmax}$ is a maximum directional antenna gain value, $A_d$ is a magnitude of said directional signal strength processor input and $A_o$ is a magnitude of said omnidirectional signal strength processor input.

22. The receiver system of claim 18, wherein omnidirectional antenna is mounted to said directional antenna at a predetermined spacing that is wavelength dependent.

23. The receiver system of claim 22, wherein said omnidirectional antenna comprises an omnidirectional ring and said directional antenna comprising a Yagi construction having a central spine carrying plural bars that are perpendicular to said spine, said omnidirectional ring being oriented along a first plane and said directional antenna being oriented along a second plane that is substantially parallel to said first plane.

24. The receiver system of claim 23, wherein said omnidirectional antenna comprises omnidirectional antenna leads connected to a side of said omnidirectional ring that is offset from said directional antenna spine, said omnidirectional antenna leads extending from said omnidirectional ring in a direction that is substantially parallel to said directional antenna bars.

25. The receiver system of claim 24, wherein said encoded RF signal has a wavelength $\lambda$, and wherein said omnidirectional ring has a diameter of approximately $0.5\lambda/\pi$, and further wherein said first plane is spaced from said second plane by a spacing distance L of approximately $(0.4\times\lambda)<L<(0.7\times\lambda)$.

26. The receiver system of claim 18, wherein said user interface comprises one or both of a visual signal strength output device or an audible signal strength output device.

27. The receiver system of claim 26, wherein said visual signal strength output device comprises a digital or analog meter and said audible signal strength output device comprises a tone generator.

28. The receiver system of claim 18, wherein said user interface comprises an encoding selector for selecting different arrows that transmit different encoded RF signals.

29. A transmitter-nock unit for installation on an arrow to construct a signal-transmitting arrow having an arrow shaft, an arrow head at a first end of said arrow shaft and a nock at a second end of said arrow shaft provided by said transmitter-nock unit, said transmitter-nock unit comprising:
   a nock having a forward end and a rearward end configured to engage a bow string;
   a transmitter unit having a transmitter and a power supply disposed within a transmitter housing;
   said transmitter housing having a rearward end and a forward end, said transmitter housing rearward end being rigidly attached to said nock forward end;
   said transmitter housing having an exterior wall that is configured for removable attachment to an opposing interior wall of said arrow shaft that defines an arrow shaft interior chamber, such that said transmitter-nock unit is removable from said arrow shaft; and
   a substantially rigid antenna unit extending rearwardly from said transmitter housing.

30. The transmitter-nock unit of claim 29, wherein said antenna unit extends rearwardly into an interior cavity in said nock.

31. The transmitter-nock unit of claim 30, wherein said antenna unit is mounted on a common circuit board that also mounts said transmitter.

32. The transmitter-nock unit of claim 29, wherein said transmitter housing comprises an electrically-conductive material and said nock comprises a plastic material, and wherein said transmitter housing is attached to said nock using a mechanical connection.

33. The transmitter-nock unit of claim 32, wherein said mechanical connection comprises a threaded connection.

34. The transmitter-nock unit of claim 29, further including a hook device on said transmitter-nock unit configured to extend laterally beyond an exterior surface of said arrow shaft and configured to snag on a target object if said arrow attempts to pass through said object, said hook device being captured between said transmitter housing and said nock.

35. The transmitter-nock unit of claim 29, wherein said transmitter unit further includes one or both of an inertial power activation switch and a magnetic power activation switch.

* * * * *